United States Patent
Nonaka et al.

(10) Patent No.: US 6,801,639 B2
(45) Date of Patent: Oct. 5, 2004

(54) DISTANCE MEASUREMENT APPARATUS

(75) Inventors: Osamu Nonaka, Sagamihara (JP); Koichi Nakata, Kokubunji (JP)

(73) Assignee: Olympus Optical Co., Ltd., Tokyo (JP)

( * ) Notice: Subject to any disclaimer, the term of this patent is extended or adjusted under 35 U.S.C. 154(b) by 575 days.

(21) Appl. No.: 09/735,246

(22) Filed: Dec. 12, 2000

(65) Prior Publication Data

US 2001/0004399 A1 Jun. 21, 2001

(30) Foreign Application Priority Data

Dec. 17, 1999 (JP) .......................................... 11-359547

(51) Int. Cl.$^7$ ................................................ G06K 9/00
(52) U.S. Cl. ..................... 382/106; 382/203; 382/291; 356/3.08
(58) Field of Search ............................... 382/106, 190, 382/199, 291, 203; 356/3.01, 3.02, 3.03, 3.04, 3.05, 3.06, 3.07, 3.08, 3.09

(56) References Cited

U.S. PATENT DOCUMENTS

| | | | | | |
|---|---|---|---|---|---|
| 5,278,602 | A | * | 1/1994 | Honma et al. ................. 396/92 |
| 5,615,398 | A | * | 3/1997 | Matsuyama ................... 396/77 |
| 5,913,082 | A | * | 6/1999 | Onoda ......................... 396/128 |
| 5,940,634 | A | * | 8/1999 | Nakamura .................... 396/104 |
| 6,229,959 | B1 | * | 5/2001 | Suda et al. .................... 396/50 |
| 6,308,014 | B1 | * | 10/2001 | Nonaka et al. ............. 396/106 |
| 6,330,055 | B1 | * | 12/2001 | Higashino .................. 356/3.06 |

FOREIGN PATENT DOCUMENTS

JP          7-19858         1/1995

* cited by examiner

Primary Examiner—Amelia M. Au
Assistant Examiner—Chong Kim
(74) Attorney, Agent, or Firm—Frishauf, Holtz, Goodman & Chick, P.C.

(57) ABSTRACT

A distance measurement apparatus of the present invention outputs image signal from the area sensor to which an optical image is input from a plurality of distance measurement areas two-dimensionally distributed in an area to be shot. A calculation control circuit detects portions changing equally to or more than a predetermined value in positive or negative directions, for the output level of pixel rows arranged on a plurality of straight lines included in the image signal. The distance measurement area is identified, based on the output of this calculation control circuit.

9 Claims, 15 Drawing Sheets

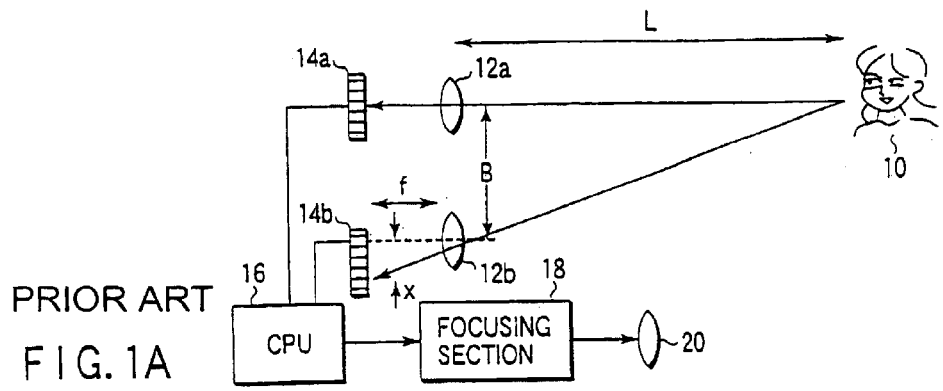
PRIOR ART
FIG. 1A
PRIOR ART
FIG. 1B
PRIOR ART
FIG. 2A
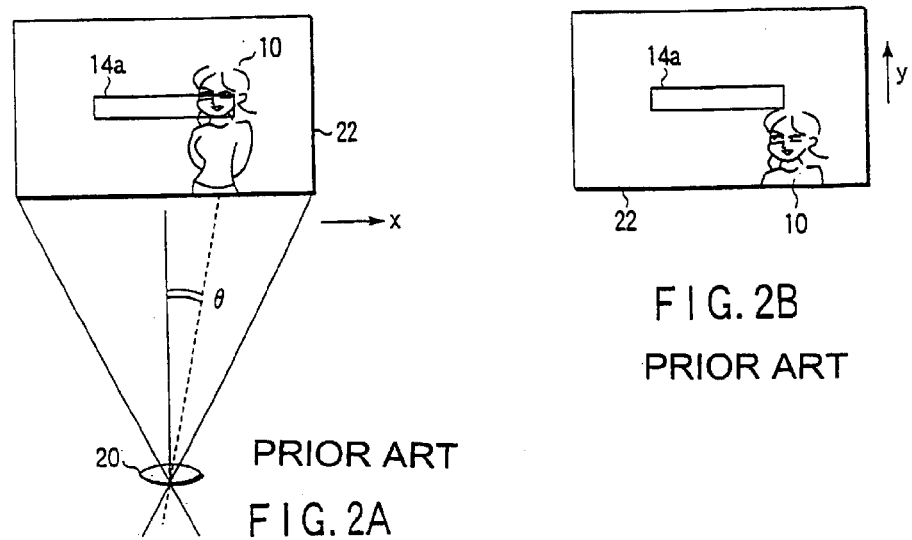
FIG. 2B
PRIOR ART

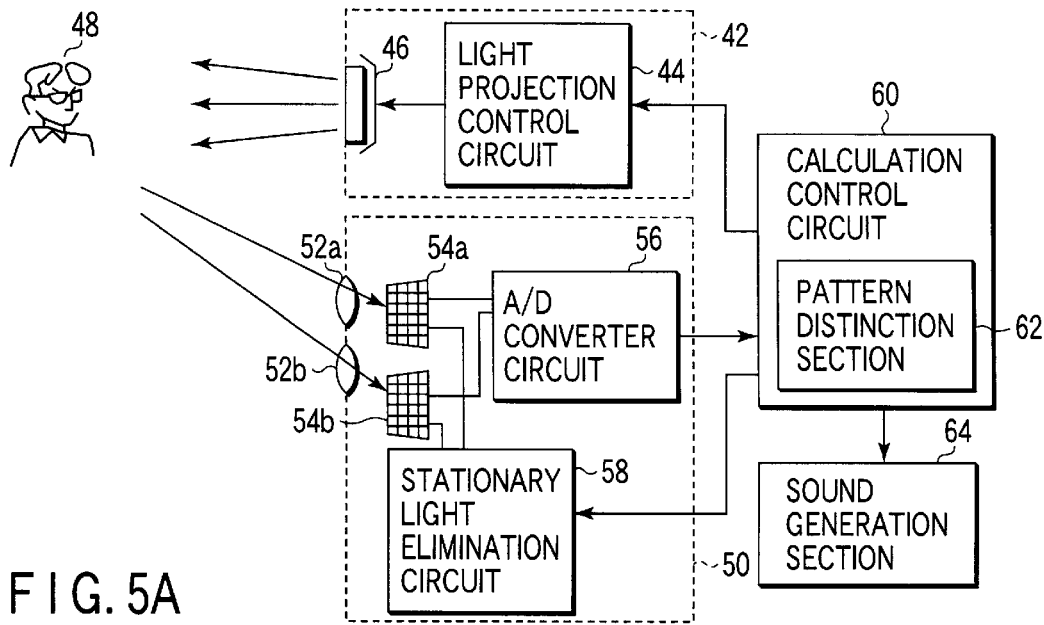
F I G. 5A
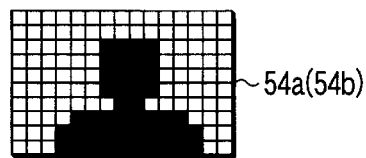
F I G. 5B

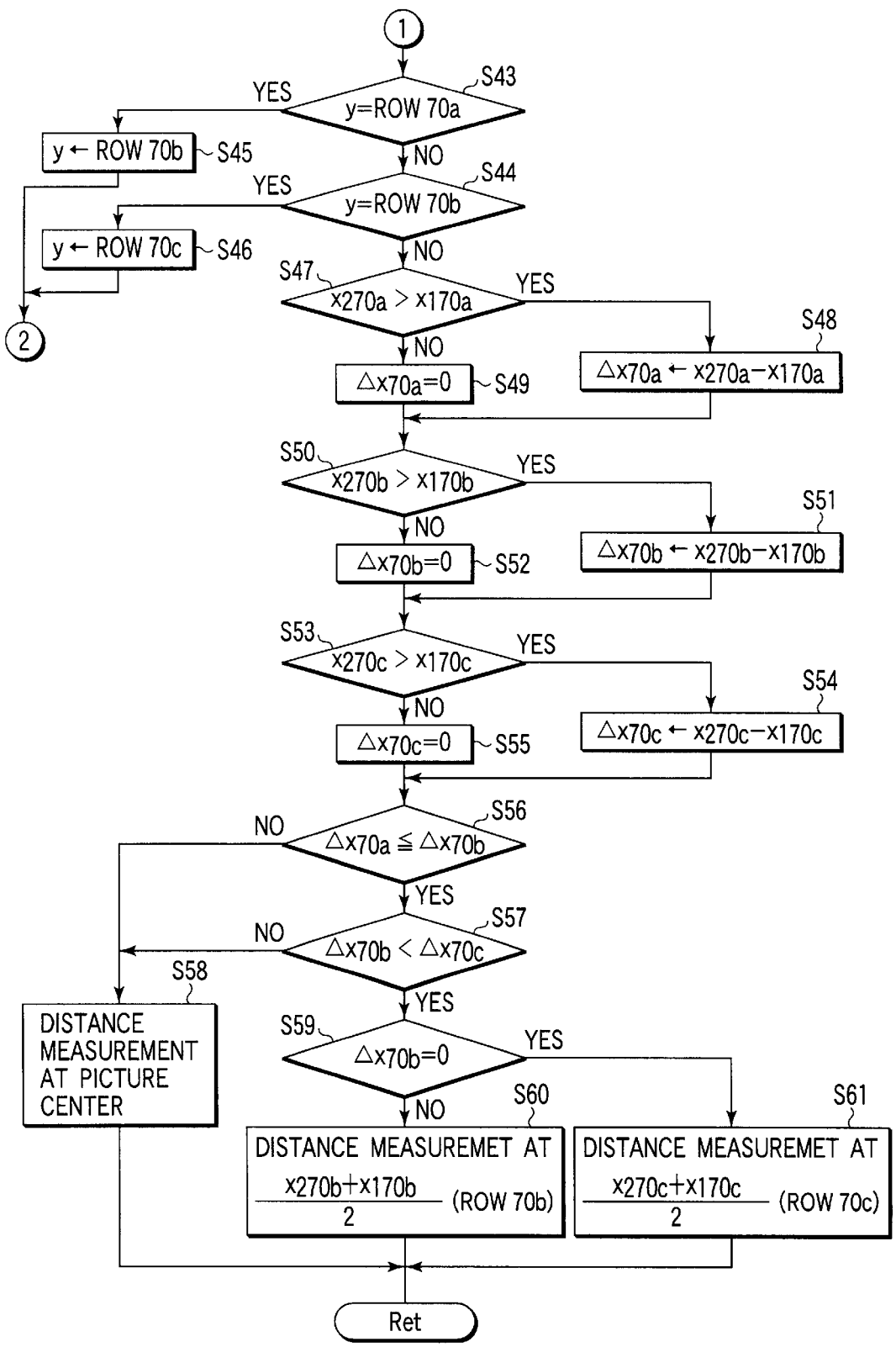
F I G. 8B

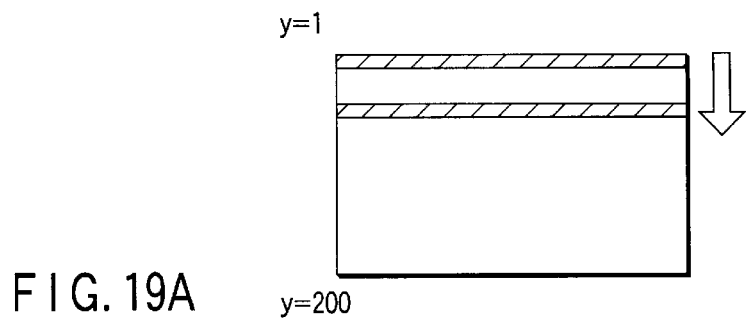
F I G. 19A
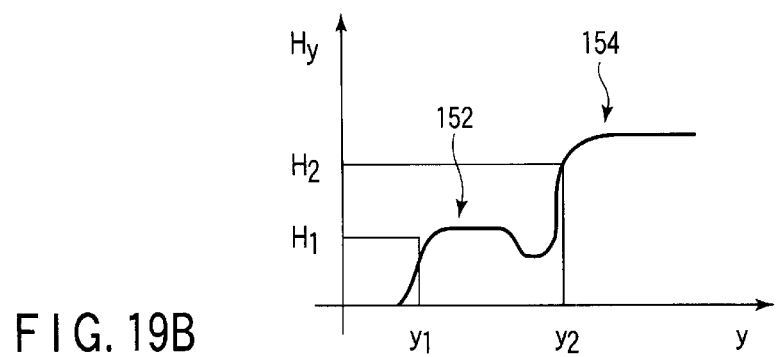
F I G. 19B
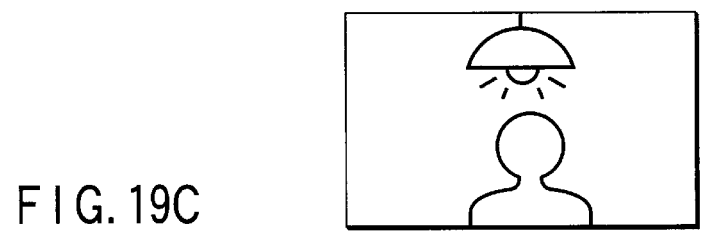
F I G. 19C
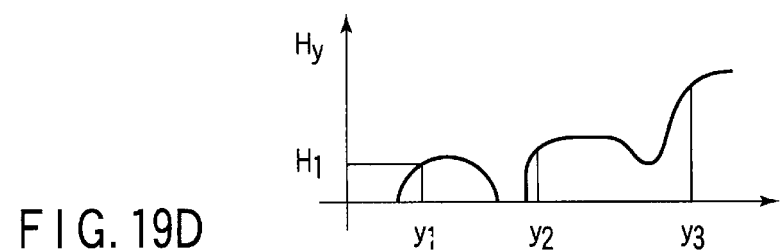
F I G. 19D

DISTANCE MEASUREMENT APPARATUS

CROSS-REFERENCE TO RELATED APPLICATIONS

This application is based upon and claims the benefit of priority from the prior Japanese Patent Application No. 11-359547, filed Dec. 17, 1999, the entire contents of which are incorporated herein by reference.

BACKGROUND OF THE INVENTION

The present invention relates to a camera distance measurement apparatus allowing to measure the distance of a wide extent in a photographic picture and, more in detail, a wide field distance measurement apparatus.

Recently, various AF (auto-focus) cameras have been developed for focusing on the point, by measuring the distances of a plurality of points in an area to be shot. These AFs are generally called "multi AF" and more the number of points that can be measured increase, more important is the technology to decide the position whose distance is to be measured.

Concerning such multi AF technology, the Applicant has proposed a technology to measure the distance giving priority to an object having the breadth of man's shoulders by Jpn. Pat. Appln. KOKAI Publication No. 7-19858.

However, though the technology described in the aforementioned Jpn. Pat. Appln. KOKAI Publication No. 7-19858 gives priority to an object having the breadth of man's shoulders, it did not correspond to a technology expanding the area whose distance can be measured in the two-dimensional directions in the picture.

BRIEF SUMMARY OF THE INVENTION

Therefore, an object of the present invention is to provide a distance measurement apparatus that can decide the distance measurement point effectively and rapidly, and focus exactly, even for an apparatus expanding the area whose distance can be measured in the two-dimensional directions in the picture.

In other words, a first object of the present invention it to provide a distance measurement apparatus measuring the distances of a plurality of points in an area to be shot, comprising:

a flash circuit for projecting flashlight into the area to be shot;

an area sensor for receiving light of the flashlight reflected from an object, provided with a plurality of pixels arranged two-dimensionally;

an A/D converter for converting respective pixel output of the area sensor into digital value, and outputting digital picture data; and a calculation control circuit for detecting a main object position in the area to be shot based on the digital picture data and, at the same time, setting the distance measurement point on the main object position, the calculation control circuit including:

an extraction section to extract a plurality of line data from the digital picture data;

a judgment section for judging a part where the signal level varies at a predetermined value or more between adjacent pixels, for each of line data extracted by the extraction section;

a detection section for detecting the main object position, by comparing the part judged by the judgment section, for the plurality of line data; and a setting section for setting the distance measurement point at the main object position detected by the detection section (corresponding to claim 1).

A second object of the present invention is to provide a distance measurement apparatus measuring the distance of a plurality of points in an area to be shot, comprising:

light projection means for projecting into the area to be shot;

an area sensor provided with a plurality of pixels arranged two-dimensionally;

extraction means to extract output from a plurality of pixel rows arranged on a straight line of the area sensor when the light is projected;

detection means for judging the presence or absence of a particular pattern part for the output of respective pixel row extracted by the extraction means, and detecting the object image pattern by comparing respective particular pattern part; and setting means for identifying the main object based on the image pattern detected by the detection means, and setting the distance measurement point at this position.

A third object of the present invention is to provide a distance measurement apparatus measuring the distance of a plurality of points in an area to be shot, comprising:

shooting means including an area sensor, for detecting images distributed in the area to be shot;

extraction means for extracting output from a plurality of pixel rows arranged in a straight line of the area sensor plane, and output from the other pixel rows parallel to the pixel rows;

judgment means for judging a part where the signal level varies at a predetermined value or more between adjacent pixels, for each of line data extracted by the extraction means; and setting means for identifying the main object position based on the information concerning the part in respective pixel rows judged by the judgment means, and setting the distance measurement point at this position.

The fourth object of the present invention is to provide a distance measurement apparatus, comprising:

an area sensor having an area extended respectively in the horizontal direction and vertical direction in an area to be shot;

extraction means for extracting sensor data rows in the horizontal direction in a predetermined ordinate in the vertical direction of the area sensor;

selection means for judging an vertical direction ordinate where the sensor data row varies, and selecting a particular vertical ordinate in the area sensor; and distance measurement means for executing the distance measurement operation, with output of sensor data rows in he horizontal direction in the vertical ordinate selected by the selection means.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

FIGS. 1A and 1B illustrate a distance measurement apparatus by triangulation principle;

FIGS. 2A and 2B illustrate the relation between a line sensor and a position whose distance can be measured by the distance measurement apparatus of FIG. 1;

FIG. 5A is a block diagram showing the composition of essential parts of the distance measurement apparatus according to a first embodiment of the present invention, and FIG. 5B shows an example of image focused on the area sensor of FIG. 5A;

FIGS. 8A and 8B are flowcharts illustrating the image pattern analysis operation of the first embodiment;

FIGS. 19A to 19D illustrate the relation between the breadth of face, breadth of shoulders and the distance measurement, when the object is a man;

DETAILED DESCRIPTION OF THE INVENTION

Figure 3A:
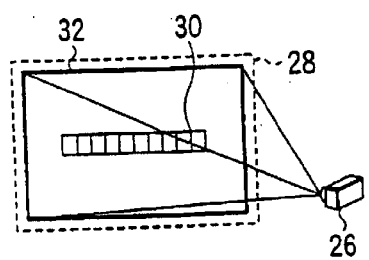
FIG. 3A shows the relation between an area to be shot by a camera and the distance measurement range.

Now, the embodiment of the present invention shall be described referring to drawings.

First, a distance measurement apparatus based on the triangulation principle shall be described referring to FIGS. 1A and 1B.

In FIG. 1A, the image of an object is detected by two sensor arrays (line sensor) 14a and 14b, through two light receiving lenses 12a and 12b disposed with an interval of the illustrated reference line length B. As the error generated by the reference line length generates the image position difference x, by an effect similar to human eyes, the object distance L can be obtained by the relation:

$$L = B \cdot f / x$$

where, f is the focal distance of receiving lenses 12a and 12b.

Therefore, a CPU 16, calculation control means, determines the relative position difference x of the object image from the output of the two sensor arrays 14a and 14b, and calculates the object distance L according to the expression. Then, an auto-focus (AF) camera can be composed, provided that a focusing section 18 of a camera shooting lens 20 is controlled.

Even if an object 10 is off the picture 22 center of the shooting lens 20, and exists at a position offset from the optical axis by an angle θ in x direction, as shown in FIG. 2A, it is enough to offset by $x_0$ the sensor position used as reference among sensor arrays 14a. In other words, the distance of the object at the position shifted by θ can be measured, by the relation $$\theta = \arctan(x_0/f)$$

Thus, the position that can be measured by the line sensor can be extended in the x direction.

However, in the aforementioned line sensor, when the object is offset in the y direction, it departs from the monitor area of the sensor array 14a, as shown in FIG. 2B. Therefore, the focusing can not be executed.

As shown in FIG. 3A, the distance measurement range 30 of the line sensor disposed in a camera 26 has been nothing but a restricted range of juxtaposition in the middle section, in respect of an area to be shot 28 by a camera. On the contrary, as the area sensor is similar to a composition where line sensors are disposed two-dimensionally, the distance measurement area can be extended to a distance measurement range 32 substantially same as the area to be shot 28.

Figure 3B:
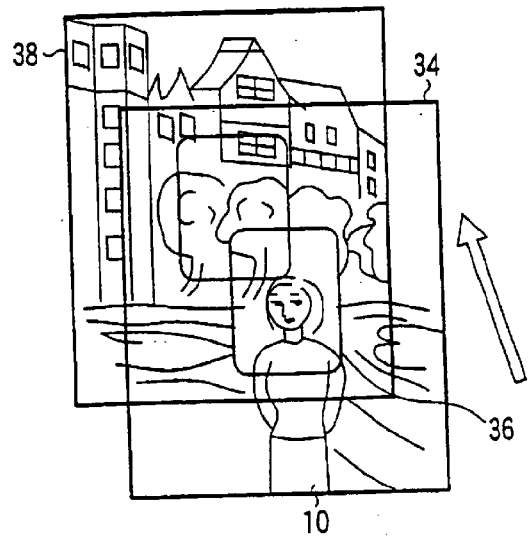
FIG. 3B shows the relation between a distance measurement point composition and a composition desired to shoot.

To shoot a composition as shown in FIG. 3B, the conventional distance measurement apparatus has been shooting by two-stepped operation as described below. Namely, first, for distance measurement, the main object is placed in the distance measurement range (distance measurement area 36 at the picture center) and the release button is half pressed to measure the distance (distance measurement composition 34). Thereafter, the camera 26 is redirected with the release button half pressed, shifted to the composition to shoot 38, and the release button is pressed further to expose, to complete a so-called focus lock operation.

However, such operation takes time for the preparatory operation before shooting, loses good opportunities while obtaining a desired composition, and was deprived of rapid availability.

Here, if the distance measurement range is enlarged by the aforementioned area sensor, the distance of the main object positioned at the picture end can be measured, even in an area to be shot as shown in FIG. 3B.

However, even when such technology to measure the distance of the object at the picture end, in practice, it becomes important to detect the position of the main object in the area to be shot, as the distance measurement point increases.

If these distance measurement points increase extremely, and these distance measurement points are checked one by one, the processing takes time, and it will require a longer time than the focus lock. This defeats its own end, and demerits of the area sensor are all the more enhanced, as it is more expensive than the line sensor.

Figure 4A:
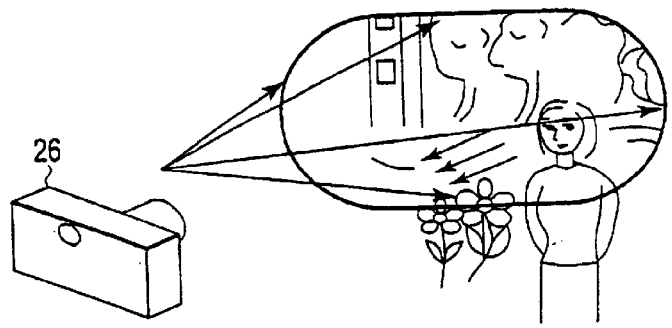
FIGS. 4A and 4B illustrate an example of rapid detection of the main object position.
Figure 4B:
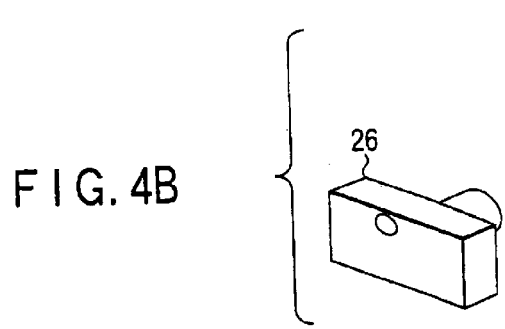
Figure 4B:
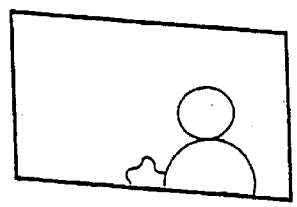

Now, the concept of a distance measurement apparatus for detecting rapidly the main object position shall be described referring to FIGS. 4A and 4B.

First, in a camera, as shown in FIG. 4A, before measuring the distance, a not illustrated flash or the like emits light in an angle corresponding to inside the area to be shot. At this moment, the distribution on the area sensor of reflected light of the reflected signal light entering the area sensor can be illustrated equivalently, as shown in FIG. 4B.

This means that the reflected signal light from a complicated background returns hardly to the camera because of its long distance, the reflected light returns from a person or flowers or others in this side, because the distance is relatively short. Therefore, the pattern of the area sensor results in an extremely simplified one, as shown in FIG. 4B.

Where does the main object exist in the area to be shot can be judged through the calculation control of this substantially binary pattern signal, by the camera calculation control section according to a predetermined pattern sequence.

As such distance measurement method, a so-called active method distance measurement, projecting another distance measurement light, or a passive method distance measurement, without projection of distance measurement light, can be changed over according to the situation of that time.

FIG. 5A is a block diagram showing the composition of essential parts of the distance measurement apparatus according to a first embodiment of the present invention. Now, a distance measurement method for detecting the object position by pre-light emission shall be described.

First, auxiliary light from a flash 46 is emitted to the object 48 under the control of a light projection control circuit 44 of a light projection section 42. The reflected signal light from this object 48 enters respective two area sensors 54a, 54b in a photometric section 50, through two light receiving lenses 52a, 52b.

These area sensors 54a, 54b receive the object image and convert photo-electrically. Output from the area sensor 54a, 54b is A/D converted in an A/D converter circuit 56, respective pixel digital value is input into a calculation control circuit 60.

Moreover, a stationary light elimination circuit 58 is connected to these area sensors 54a, 54b. This stationary light elimination circuit 58 eliminates direct current like optical signal incident regularly from the area to be shot is eliminated under the control of the calculation control circuit 60, and only pulse light (auxiliary light) from the flash light is obtained as output light.

Therefore, in a state where the stationary light elimination circuit 58 is running, when reflected signal light is received on the area sensors 54a, 54b, an image made of black parts is formed on their light receiving surface as shown in FIG. 5B. The pattern analysis of the image formed on such area sensor is performed by software integrated in the calculation control circuit 60. For example, if the image pattern is judged to be a human form by a judgment method described below by a pattern distinction section 62, it can be taken as main object.

Here, the judgment result of the pattern distinction section 62 is announced, for instance, by sound, by a sound generation section 64.

Figure 6:
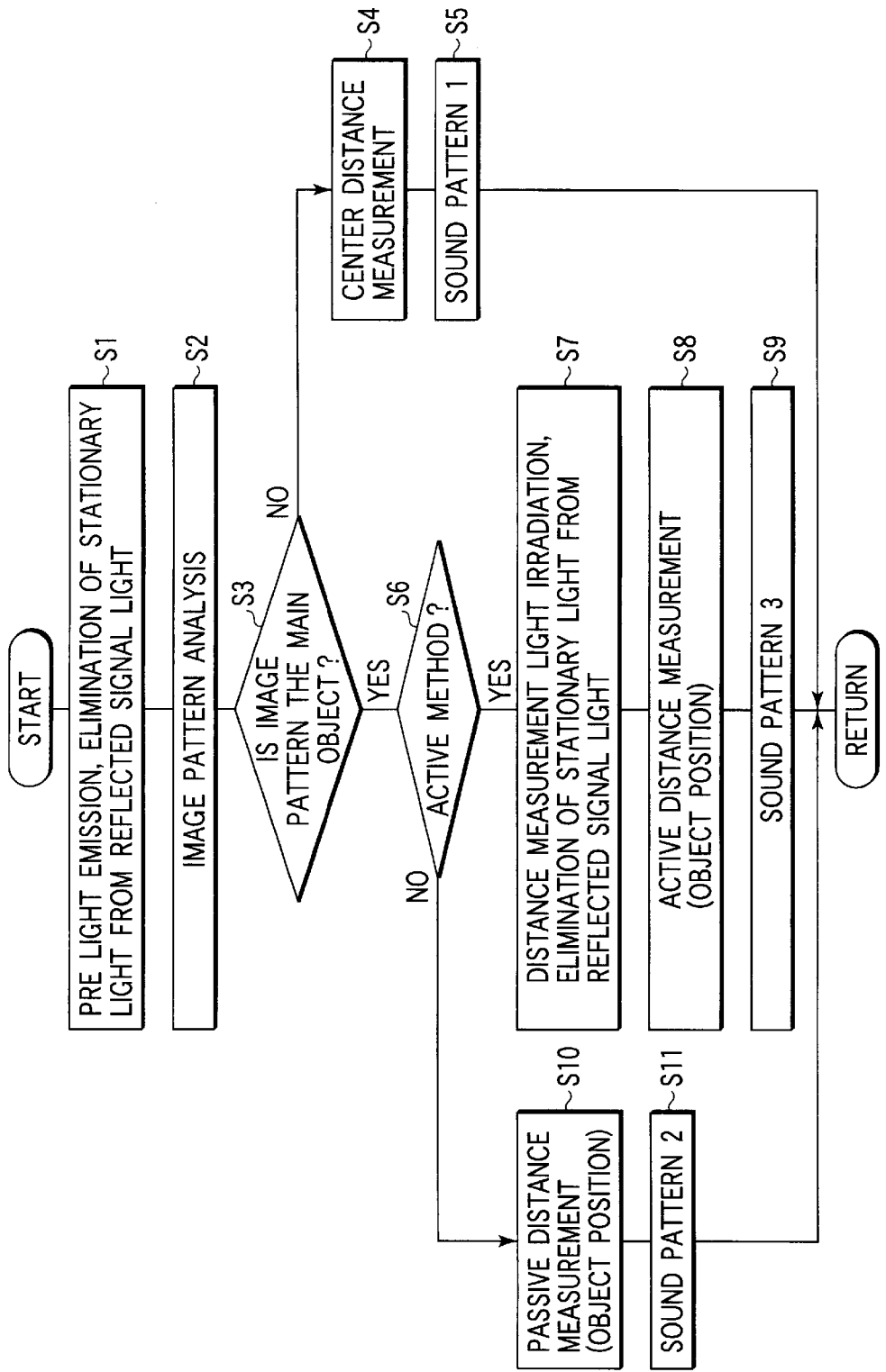
FIG. 6 is a flowchart for illustrating the distance measurement by the distance measurement apparatus of the first embodiment.

Next, the distance measurement by the distance measurement apparatus of the first embodiment shall be described referring to he flowchart of FIG. 6.

First, before beginning the distance measurement, in the step S1, the flash 46 emits light preliminarily and auxiliary light is projected to the object 48, under the control of a light projection control circuit 44 in the light projection section 42. Then reflected signal light from the object 48 enters the area sensors 54a, 54b. At this point, the stationary light elimination circuit 58 operates to eliminate stationary light from the reflected signal light focused on the area sensors 54a, 54b, and image signal made only of reflected signal light is extracted.

Then, in the step S2, the image signal A/D converted by the A/D converter circuit 56 is input into the calculation control circuit 60. Thereby, the image focused on the area sensors 54a, 54b is pattern analyzed by software.

Now, the distance measurement point decision by this image pattern shape shall be described.

First, how to judge a person shall be explained.

Figure 7A:
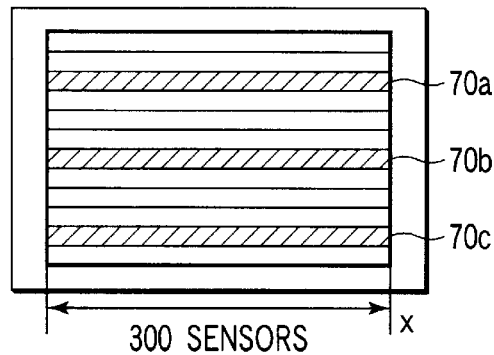
FIGS. 7A to 7D illustrate the area sensor line of the first embodiment.

As shown in FIG. 7A, the area sensor comprises several rows (lines) of juxtaposed line sensors viewing a picture; therefore, first, a simple method consisting in judging by taking out representative three lines 70a, 70b, 70c among these lines shall be described.

Figure 7B:
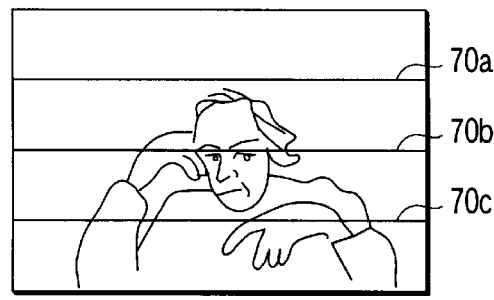
Figure 7C:
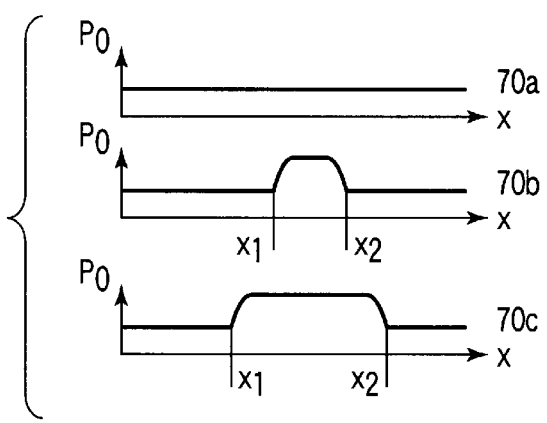

In a composition as shown in FIG. 7B, there is no person on the line 70a, while the lines 70b and 70c cross respectively the object face and body. Therefore, as shown in FIG. 7C, output results by the reflected light of respective lines can be obtained. In this embodiment, the convex type distribution of refection amount distribution of these respective lines are investigated to judge if the object is a person or not.

Figure 8A:
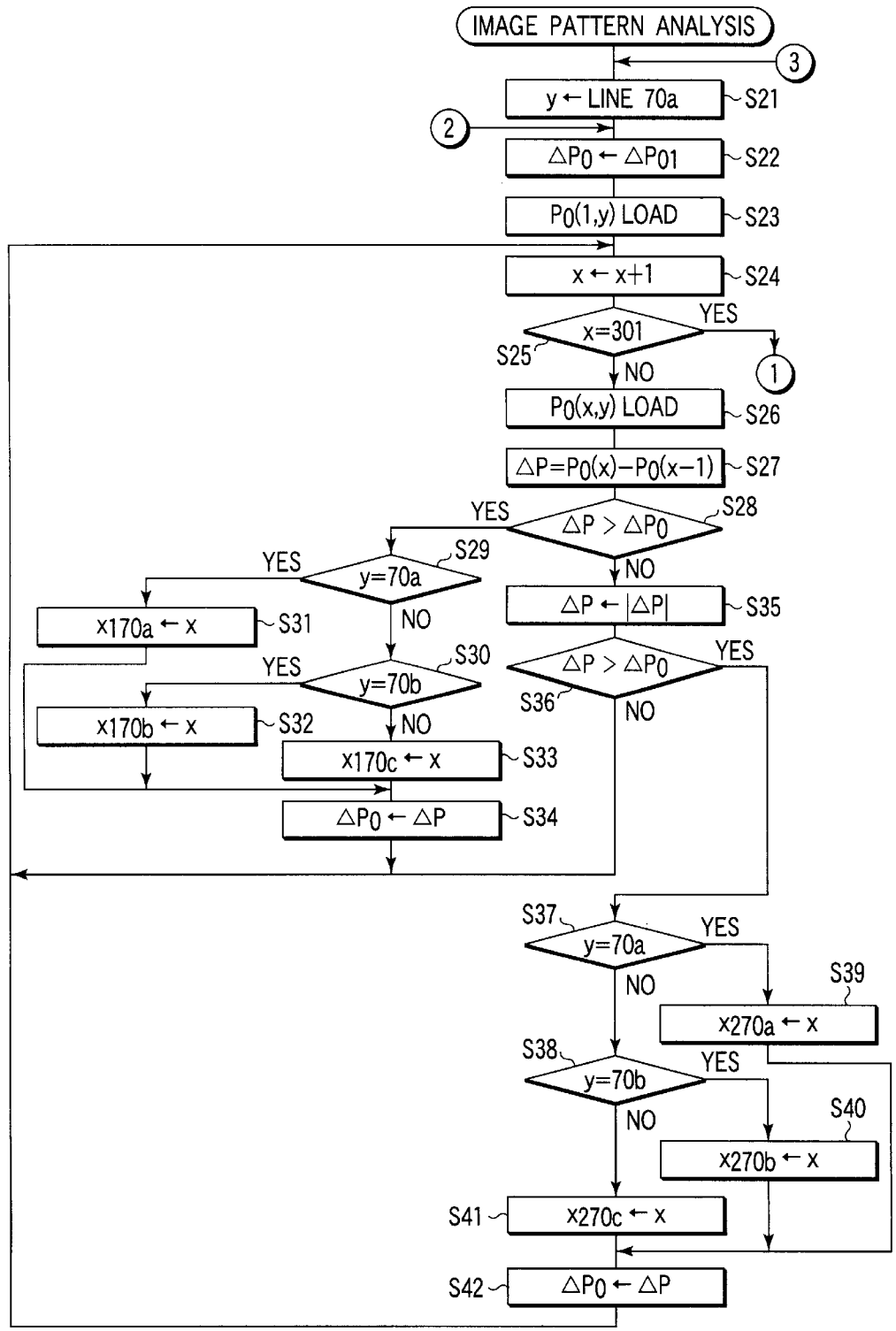

FIGS. 8A and 8B are flowcharts illustrating the image pattern analysis operation for executing this judgment.

In the step S21, first, it is designated to judge along the line 70a. The same setting for the lines 70b and 70c is repeated in the step S45, S46, to execute this routine.

In the step S22, a predetermined variation amount $\Delta P_{01}$ is put in the convex judgment variation amount $\Delta P_0$. The convex type is identified by a variation larger than this variation amount. Next, in the step S23, the CPU load the (l, y) coordinates of the area sensor extended along x, y coordinates, namely, the first sensor output of the line 70a. As 300 sensors are arranged in the x direction, in the following steps S24, S25, the flowchart after the step S26 is repeated, increasing x up to 300.

In the step S26, sensor output is loaded into the CPU increasing x sequentially. Then, in the steps S27, S28, S35, S36, the results is compared with the result of the adjacent sensor. Namely, in the step S28, the portion of increasing output is judged, and in the step S36, the decreasing portion is judged.

In the step S28, if an increase equal or superior to $\Delta P_0$ mentioned above is recognized, and a decrease is observed in the step S36, the aforementioned convex type is detected. Shifting from the step S28 to the steps S29~S33, or shifting from the step S36 to the steps S37~S41, values of x forming this convex portion are classified into respective lines (lines 70a, 70b, 70c of FIGS. 7A to 7D) and memorized by the CPU. For instance, if a convex type is detected on the line 70a, its rising x abscissa is represented as $x_{170a}$ and the falling x abscissa as $x_{270a}$.

On the other hand, $\Delta P_0$ is set again in the step S34, S42, for increasing somewhat the judgment level and preventing the judgment of the step S28, S35 from repeating.

Next, in the step S43 and 44, it is judged which is y among rows 70a to 70c. If the y is the row 70a, it goes to the step S45 to change to the row 70b, and if y is the row 70b, it goes to the step S46 to change to the row 70c. After the step S45 and S46, it returns back to the step S22 and, similarly, the convex portion judgment is performed.

In this convex portion judgment, as it has chances to be concave shape in this step, it is confirmed that the risen x abscissa is a number smaller than the rising x abscissa in the step S47, S50, S53.

Only when the conditions are met in the steps 47, S50, S53, it passes to the steps S48, S51, S54 and convex portion width $\Delta x_{70a}$, $\Delta x_{70b}$, $\Delta x_{70c}$ are determined as the difference of rising and falling coordinates obtained previously. On the other hand, if the conditions are not met in the steps 47, S50, S53, it passes to the steps S49, S52, S55 and convex width is set to "0".

Figure 7D:
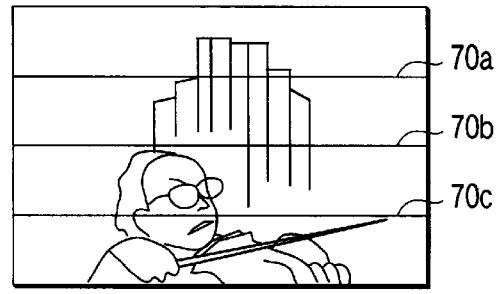

Thereafter, in the step S56 and S57, it is judged by whether these widths increase sequentially $\Delta x_{70a} \leqq \Delta x_{70b} < \Delta x_{70c}$. If this condition is not met, as shown in FIGS. 7B, 7D, it is judged that a person is not distinguished, because head, shoulders are not detected from above and it passes to the step S58 (it is made that it is judged "NO" in the step S3 in the flowchart of FIG. 6).

On the other hand, in the step S59, it is judged if the convex portion of the center row 70b is detected. Here, if it can not be detected ($\Delta x_{70b}=0$), it passed to the step S61, and it is judged to be a composition as shown in FIG. 7D, and the distance is measured mainly in the vicinity of the row 70c for ordinate, and in the vicinity of the convex portion center for abscissa.

Besides, if it is a composition as shown in FIG. 7B, it passed to the step S60, and the ordinate of the area sensor is the row 70b, abscissa $(x_{270b}+x_{170b})/2$, and the convex portion center is the essential area.

Thus, in the flowchart of FIGS. 8A and 8B, if is passed to the step S60, S61, it is so made to be judged "YES" of the flowchart of FIG. 6. In FIG. 6, the step S6 judges which of active type distance measurement or passive active type distance measurement is better. Therefore, it may devised, for instance, to give privilege to the active type for its better effect of light projection, if $\Delta P_0$ is large, according to the result of the height $\Delta P_0$ of the convex portion edge, or the like.

As described above, these devices allow to detect automatically a person not only in a composition as shown in FIG. 7B but also in a composition as show in FIG. 7D, and it becomes possible to judge if it is a person or not and branch, in the step S3 of the flowchart of FIG. 6.

Therefore, in the judgment of step S3, if the image pattern is not judged as main object, in other words, if the main object position can not be identified (NO), it passes to the step S4, brightness information or others are added, active method or passive method is selected, and thereafter, the distance of the picture center portion presenting higher object existence possibility is measured mainly.

Then, in the step S5, the calculation control circuit 60 selects the pattern meaning that the main object pattern can not be identified, and the distance of the picture center portion is measured, and announces the user by sound (sound pattern 1) from the sound generation section 64.

On the other hand, in the judgment of step S3, if the image pattern is judged as main object (YES), it passes to the step S6, it is judged to measure the distance by active method or passive method, according to the intensity and enough or weak contrast of image signal (optical signal) forming the image pattern.

Here, if it is judged that the image signal (optical signal) does not allow to obtain a sufficient contrast (YES), the distance is measured by the active method. Therefore, it passes to the step S7 and the object 48 is irradiated again with distance measurement light from the light projection section 42, and the stationary light elimination circuit 58 is activated. Then, stationary light is eliminated from the reflected signal light focused on the area sensors 54a, 54b, and only image signal of reflected signal light is taken out. Next, in the step S8, the distance is measured by the active method essentially for the main object position obtained by preliminary light emission.

Then, in the step S9, the main object position is identified among the sound signal patterns, the active distance measurement method is selected, the user is announced by sound (sound pattern 3) from the sound generation section 64 and then it returns.

On the other hand, in the judgment of step S6, if the image signal is judged to be weak (NO), it passes to the step S10, the distance is measured by passive method using mainly the image signal of already determined main object position. Then, in the step S11, the main object position is identified among the sound signal patterns, the passive distance measurement method is selected, and the user is announced by sound (sound pattern 2) from the sound generation section 64. Thereafter, it returns.

The calculation control circuit 60 selects the sound signal and informs the user, according to the judgment of possibility of these distance measurement methods and main object, thereby allowing to understand the shooting conditions or others, and measure the distance securely, Consequently, this embodiment allows to perform up to the detection of main object position very accurately using the active method and passive method, in place of only combining both methods as hybrid.

Now a variant of the first embodiment shall be described.

In the present invention, not only selecting simply a sound pattern and informing by sound as the aforementioned first embodiment, but also, the display in the finder may be changed.

Figure 9A:
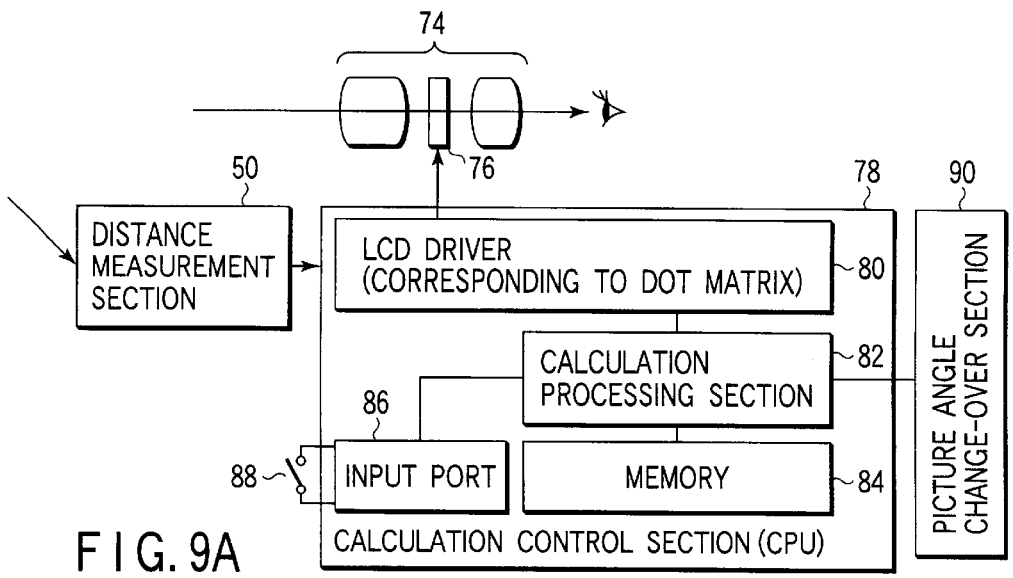
FIGS. 9A and 9B illustrate the composition of a CPU, integrating a matrix LCD driver, and allowing to change over the LCD transmissivity in the finder depending on the distance measurement results.

As shown in FIG. 9A, the main parts of the distance measurement apparatus according to this variant comprises a distance measurement section 50, a matrix LCD driver 80 in a calculation control section (CPU) 78 for changing the transmissivity of LCD 76 in the finder 74, a picture angle change-over section 90 for changing the shooting range under the control of a calculation processing section 82, an input port 86 for accepting signal from a focus lock switch (1st release switch) and a memory 84 to memorize software and data for processing.

Such composition allows the matrix LCD driver 80 integrated in the calculation control section 78 displays by changing over the transmissivity of LCD 76 according to the distance measurement results. Such change over display allows to announce the user for an easy understanding.

Figure 9B:
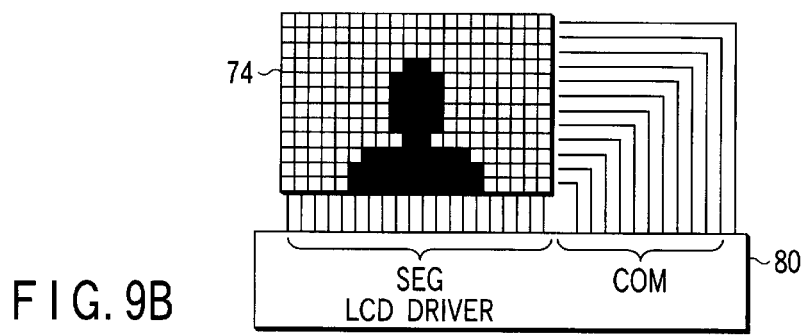
Figure 10:
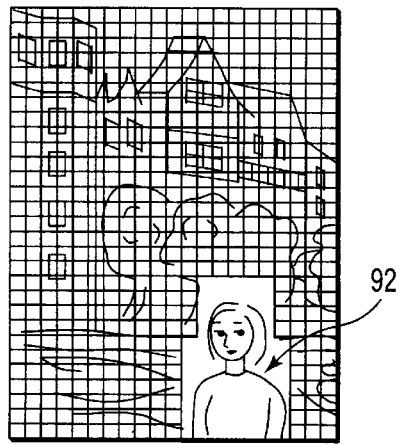
FIG. 10 shows a state monitoring the area to be focused by a camera in the finder.

For instance, as shown in FIG. 9B, if the matrix LCD driver 80 decides the transmission portion by image pattern corresponding to FIG. 5B, for an object image, and controls the selection signals of common (COM) and segment (SEG), the area the camera is focusing in the finder can be monitored as shown in FIG. 10. Here, an example wherein an transmission area 92 is decided according to the image pattern, and the other areas are controlled to lower the transmissivity is shown.

Figure 11:
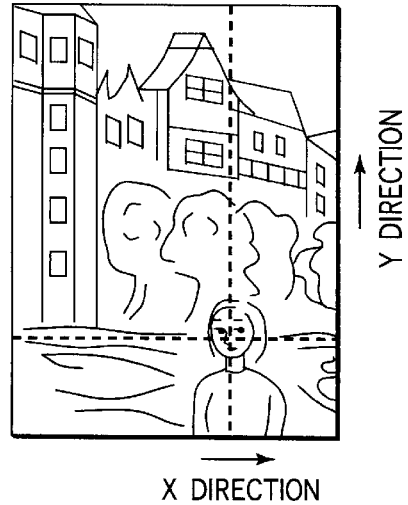
FIG. 11 shows an example indicating the distance measurement point by the intersection of a cross.

Otherwise, the distance measurement point can be displayed by the intersection of a cross as shown in FIG. 11. For this, the LCD in the finder may be made non permeable in a form to extend axes indicating the coordinates of the distance measurement point in the X, Y directions.

Confirming such display through the finder, the use can confirm if their camera is working correctly.

If the camera display is wrong, the main object detection may also be wrong; therefore, in such case, it may be designed to measure the distance again, by performing the focus lock operation shown in FIG. 3A again.

In this case, the user operates the focus lock switch 88 disposes as shown in FIG. 9A. Further, to make the distance measurement point correspond to the finder screen, the calculation processing section 82 calculates the correspondence based on the measurement results and the picture angle during the operation of the picture angle change-over section 90, and reflects the results thereof to the LCD display.

Now, the distance measurement apparatus according to a second embodiment shall be described.

Figure 12:
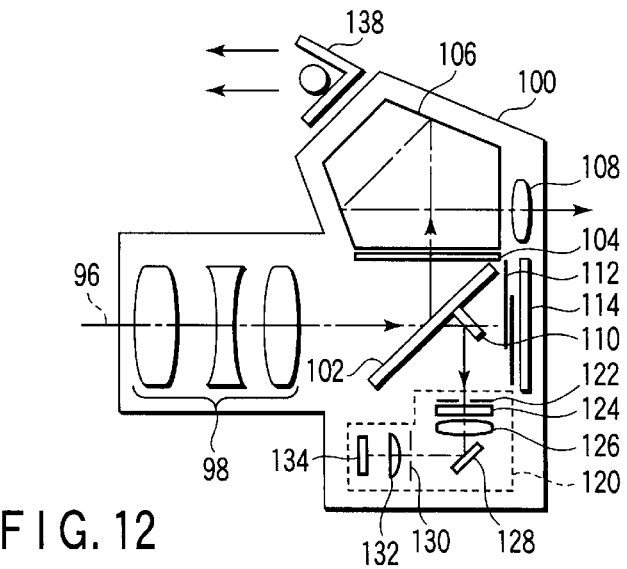
FIG. 12 shows a second embodiment of the present invention, and shows the composition of a single-lens reflex camera.

FIG. 12 is a cross section showing an example of composition of the distance measurement apparatus of the present invention applied to a single-lens reflex camera.

In FIG. 12, light beam from the object passing through a shooting lens 98 along an optical axis 96 is reflected by a main mirror 102 in a camera body 100 or passes it trough. The light beam reflected by this main mirror 102 is directed to a finder 106 through a LCD 104. On the other hand, the light beam that has passed through the main mirror 102 is reflected by a sub mirror 110 and directed to a focus detection section 120 disposed at the bottom of the camera body 100.

The LCD 104 is disposed in the finder 106, and the focus position in the area to be shot is displayed under the control of not shown calculation control section. The user can confirm this display through an eye piece 108 disposed behind the finder 106.

The main mirror 102 retracts upward from the light path (mirror up) during the shooting. In this case, light beam from the object passing through the shooting lens 98 focuses on a film 114 through a shutter 112 disposed behind the main mirror.

The focus detection section 120 detects the focus by phase difference detection method. This focus detection section 120 comprises a field mask (S mask) 122 for converging light beam that has passed through the shooting lens 96, an infrared cut filter 124, a condenser lens (C lens) 126 for collecting light beam, a total reflection mirror 128 for totally reflecting the light beam, an iris mask 130 for limiting the light beam, an area sensor 134, and refocus lens (S lens) 132 for refocusing the light beam on the area sensor 134.

Besides, a flash apparatus 138 is disposed outside the camera body 100 and functions as auxiliary light projecting means during focus detection.

Figure 13:
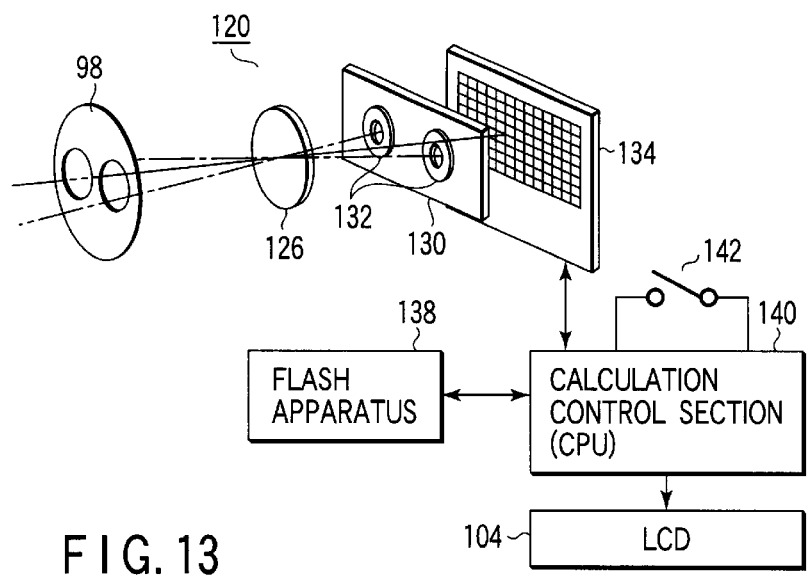
FIG. 13 is the perspective view of the focus detection section of FIG. 12, and its control system.

FIG. 13 is the perspective view of the focus detection section 120 mentioned above and its control system. In this composition, a S lens 132 for passing the light beam from a not illustrated object, is disposed behind the iris mask 130.

The calculation control section (CPU) 140 controls the operation of the area sensor 134 and the flash apparatus 138. This calculation control section 140 initiates the integration operation of the area sensor 134, and emits light from the flash apparatus 138 as necessary, for obtaining sensor data during light emitting or non light emitting period.

The calculation control section 140 reads out sensor data from the area sensor 134, detects the main object and calculate the focus detection or others. Besides, the calculation control section (CPU) 140 is provided with a next candidate switch 142.

Figure 14:
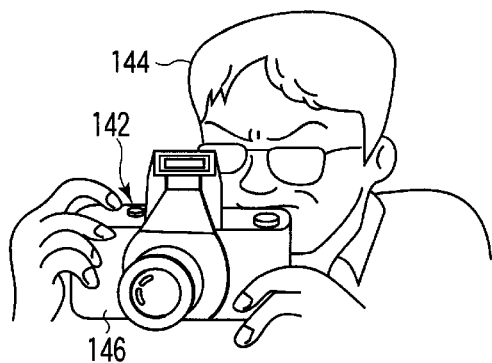
FIG. 14 is the exterior of a camera according to the second embodiment.

FIG. 14 is the exterior of a single-lens reflex camera according to the second embodiment.

Figure 15A:
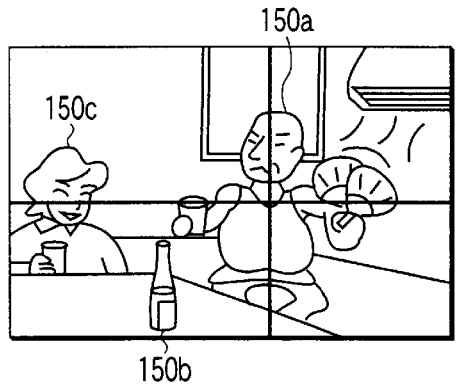
FIGS. 15A to 15C illustrate the focusing by the camera according to the second embodiment.
Figure 15B:
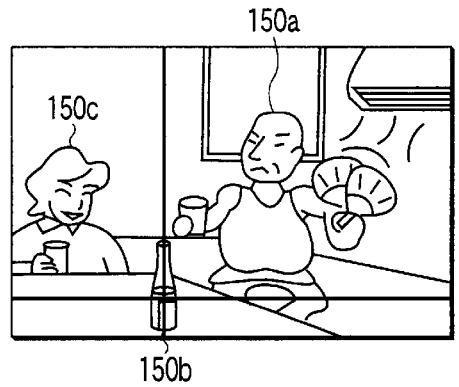
Figure 15C:
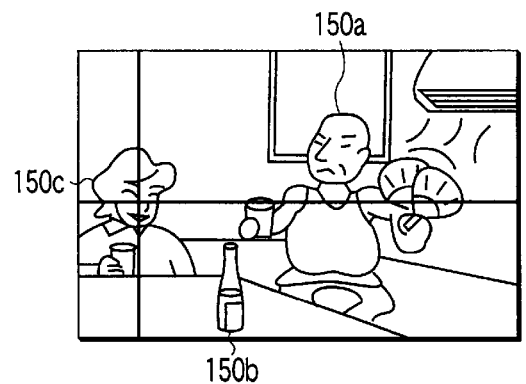

Even with a camera to which the present invention is applied, as the picture composition is complicated such an area to be shot as shown in FIGS. 15A to 15C, sometimes which to select as main object can not be judged. Here, it is supposed that the distance measurement point is displayed by the intersection of a cross.

Basically, as shown in FIG. 15A, it can be focused with a high possibility, if the priority is given to the pattern of a person 150a situated at the center of the picture. However, under some conditions, it is focused by mistake on a bottle 150b as shown in FIG. 15B or the photographer wants to focus on a person 150c nearby as shown in FIG. 15C.

In this case, many complaints can be solved by making the user 144 operate the next candidate switch 142 provided on the camera 140, the CPU 140 to judge the next focusing candidate, and the LCD 104 in the finder designate for the understanding of the user.

Thus, applied to the single-lens reflex camera, the exact focusing or not can be distinguished on the area to be shot, the user can easily confirm the focus point and the shooting can be performed without fault.

As described in detail above, the second embodiment can provide a distance measurement apparatus allowing to measure the distance correctly even for shooting night scenery with dark background behind the object, by eliminating the influence of the object brightness difference or the background.

Moreover, if a line sensor is used for the distance measurement apparatus of the present invention for obtaining a distance measurement range extending approximately same as the area to be shot, light is emitted preliminarily to the distance measurement operation, and the position of the main object to be focused in the area to be shot is identified, the availability can be improved, by eliminating the two-stepped exposure operation by focus lock operation.

Moreover, for a complicated composition comprising a plurality of objects in the area to be shot, the user can select the desired object by a simple operation, all the way directing the camera; therefore, it is not required to redirect the camera to place the object in the distance measurement range.

Figure 16A:
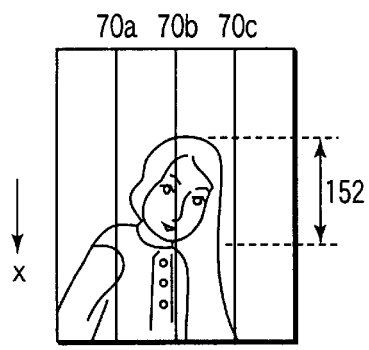
FIGS. 16A and 16B illustrate area sensor lines adapted to a vertically disposed composition.
Figure 17:
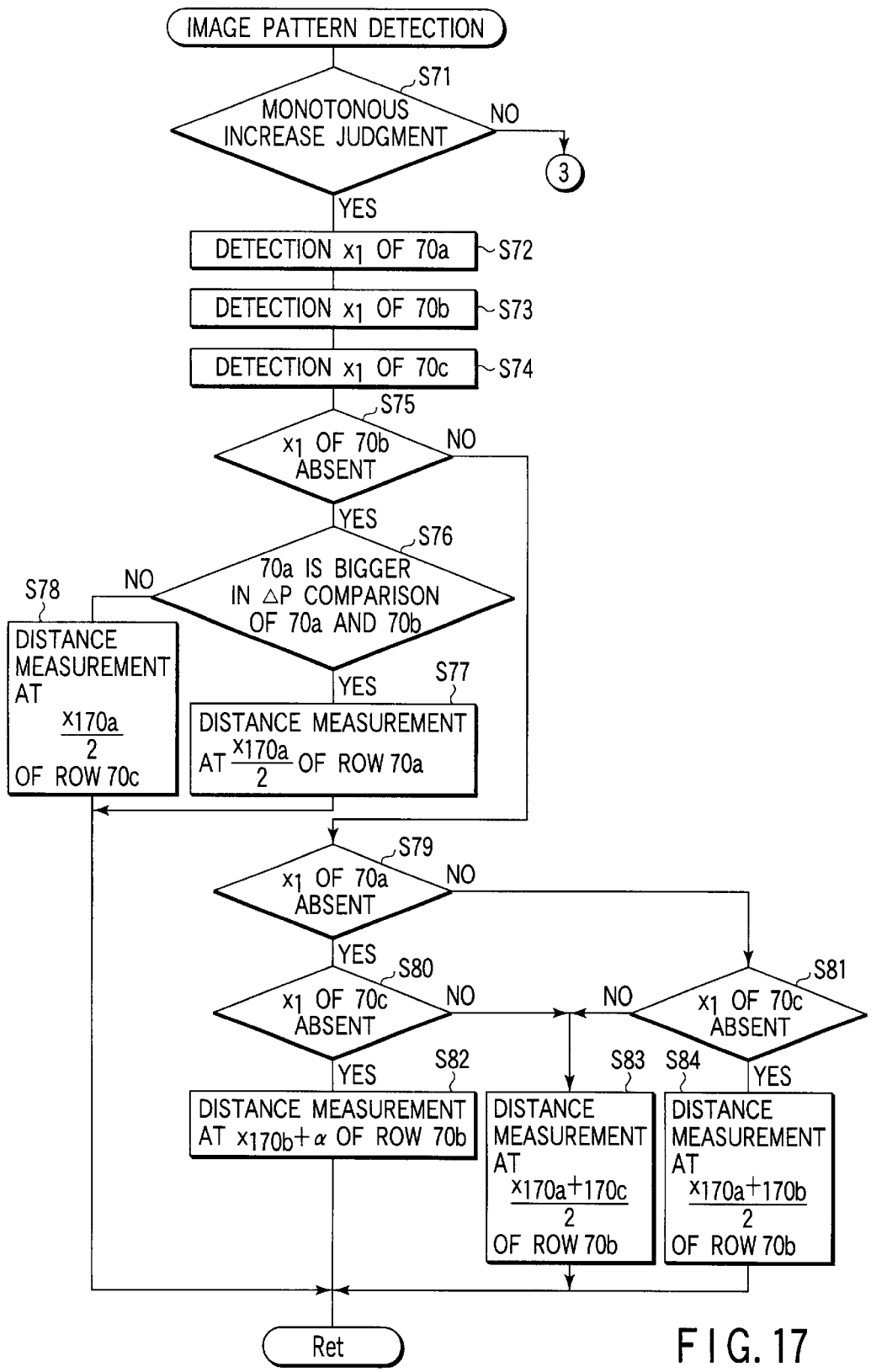
FIG. 17 is a flowchart illustrating the operation of an image pattern detection added to the flowchart of FIGS. 8A and 8B, in order to respond to the vertically disposed composition of FIG. 16A.

By the way, as a concrete example of step S2 and S3 in the flowchart of the aforementioned FIG. 6, a flowchart shown in FIG. 17 can be added to the flowchart shown in FIGS. 8A and 8B to respond to a vertically disposed composition as shown in FIG. 16A.

Namely, in the step S71, it is judged if the sensor output has a pattern increasing in the same direction as shown in FIG. 16A for three sensor rows (lines) 70a, 70b, 70c provided on the area sensor as shown in FIG. 7A. Then, in the step S72 to S74, the starting point of the variation of lines 70a, 70b, 70c of respective line sensor is detected as $x_1$. Respective line's $x_1$ of the lines 70a, 70b, 70c are set as $x_{170a}$, $x_{170b}$, $x_{170c}$.

Figure 16B:
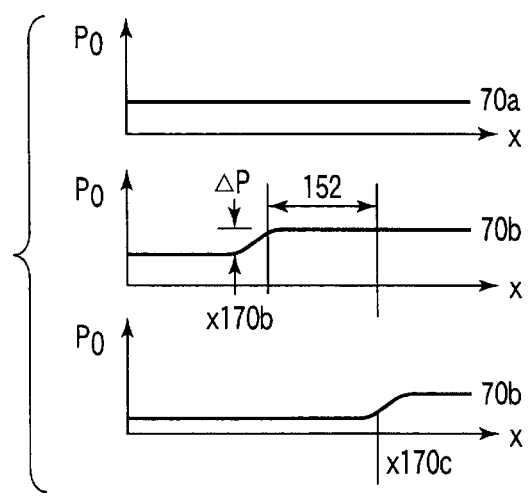

For instance, in a scene as shown in FIG. 17A, the differential of this $x_1$ is considered to be the head 152 of the object (refer to FIG. 16B). Next, in the step S75, it is inquired if a monotonous variation starting point $x_1$ is on the line 70b, in the picture center, where the object has good chances of existence.

If there is no variation here, it is considered that the thing on the line 70a, 70c on the both ends is not the object but the other thing. The object with lager magnitude of sensor difference ΔP is considered to be near the camera, as more light is reflected, and the nearer object shall be taken as the main object.

In the step 75, if there is no change, it passed to the step S76 to compare the magnitude of ΔP. As the result, if ΔP of the line 70a is superior to ΔP of the line 70c, it passes to the step S77, and the distance is measured with $x_{170a}$ of the line 70a. On the contrary, if ΔP of the line 70c is superior to ΔP of the line 70a, it proceeds to the step S78, and the distance is measured with $x_{170c}$ of the line 70c.

Besides, in the step S75, if the output of the line 70b has changed, namely, if it is judged that a person is in the center of the picture as shown in FIG. 17A, it passes to the step S79. Then, in the step S79 to 81, the variation on the line sensors 70a, 70c on both ends is verified.

If there is no variation of output $x_1$ from the line 70a in the step S79, and no variation of output $x_1$ from the line 70c in the step S80, it is a composition where a person stands in the center of the picture, the person does not cross the line 70a, 70c. Therefore, it passes to the step S82 and the distance is measured mainly for y=line 70b, $x=x_{170b+\neq}$.

On the other hand, if there is no variation of output $x_1$ from the line 70a in the step S79, and there is variation of output $x_1$ from the line 70c in the step S80, passes to the step S83. It is the example of the scene shown in FIG. 17A.

Besides, if there is variation of output $x_1$ from the line 70a in the step S79, and there is variation of output $x_1$ from the line 70c in the step S80, it is a scene where shoulders cross also the line 70a, and it passes to the step S83 to measure mainly the distance of a point on the line 70b in the center of the picture, and having an abscissa $(x_{170b}+x_{170c})/2$ corresponding to the head (152) center of the object as x.

Moreover, if there is variation of output $x_1$ from the line 70a in the step S79, and there no variation of output $x_1$ from the line 70c in the step S80, it passes to the step S84. As it concerns a line symmetrical composition as shown in FIG. 17A, the object head is set as the center of distance measurement following the same method as the step S83.

Such embodiment allows to focus on a person correctly and rapidly even for a vertical composition.

These aforementioned embodiments of person judgment are simplified by using three line sensors composing an area sensor; however, the precision can be improved by scanning abscissas in y direction one by one, or by a similar resolution, as shown in FIG. 19A.

Here, the observation of convex type sensor data variation as shown in FIG. 7C is taken into consideration, when a person exists as shown in FIG. 7B, and it is supposed that the head and the body can be detected by the variation of the width $H_y$ of this convex portion.

For image pattern detection operation, in the step S91 to S93, the convex type variation of the first row (y=1) is monitored. If it can not be detected here, it is set to $H_1=0$.

Next, in the step S94, the y ordinate is modified and in the step S95, as shown in FIG. 19A, it is judged if the end of y (y=200) is attained or not. If it is not attained, in the step S96 and S97, the same sequence as the step S92 and S93 is performed.

It if judged if the width has changed in the step S98. Here, if the width has changed, in the step S99 to S101, the changed width $H_y$ is memorized as $H_m$. It becomes $H_m=H_1$ for the first change, and corresponds to the head judgment as shown in FIG. 19B. Also, the ordinate at the moment of change is memorized as $y_m$. This m is incremented in the step S101 each time $H_y$ increases the step S98.

When this flowchart is repeated, ordinates $y_1$, $y_2$ are determined according to the variation of the head 152 and shoulders 154 as shown in FIG. 19B, it becomes possible to measure the distance mainly of the face central portion, by calculating the coordinates between the head top section and the shoulders, in the step S107. In this case, the convex portion central abscissa is taken for the x direction.

However, in a scene shown in FIG. 19C, a graph (y versus $H_y$) as shown in FIG. 19D is obtained, and the lamp is focused if a countermeasure is not taken. Consequently, even when once the breadth has became equal or superior to 0 in the step S102 ("NO" in the step S102, if $H_y$ becomes 0 again ("YES" in the step S103), it passes to the step S104 and S105, and again, an action is taken for canceling $H_1$ or obtained $y_1 \sim y_m$.

This is a flow to distinguish the lamp and the person as separate things in a situation as shown in FIG. 19C, and the lamp is eliminated in the step S106, making it a composition giving priority to the object connected to the ground direction. Thereafter, the distance measurement is performed in the step S107, and the person judgment is performed in the step S108.

Figure 20:
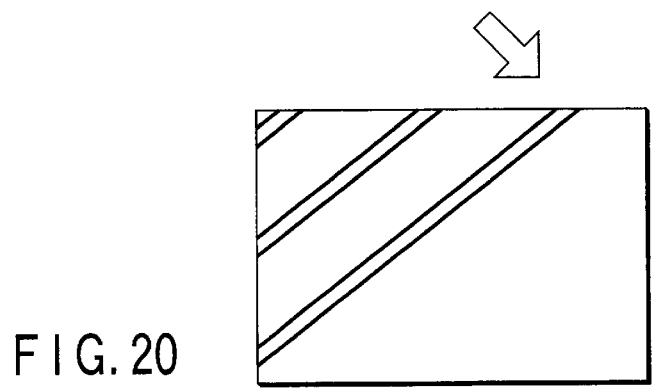
FIG. 20 shows an example of sensor array using a sensor arrangement on a particular straight line.

As described above, this embodiment can provide a camera that can detect human head and shoulders all over the picture area, detect thereby substantially the center of human face and focus very accurately. Besides, when area sensor is used as line sensor as mentioned before, without limiting to x, y directions, sensor array on a particular straight line can be used, and shifted as shown in FIG. 20.

Figure 21A:
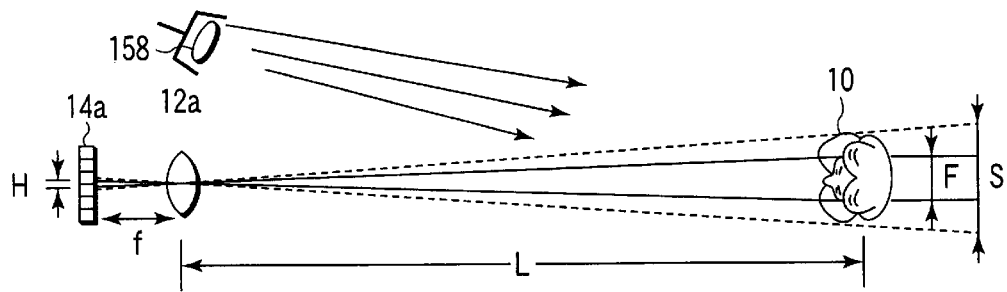
FIGS. 21A and 21B shows an example of distance measurement using auxiliary light.

Thus obtained breadth on the sensor can be converted into human face breadth or breadth of shoulders, using light receiving lens focal distance f and object distance L. As shown in FIG. 21A, if the distance of a person having the face breadth F is measured by projecting auxiliary light 158, the breadth H of a image on the area sensor can be obtained by the following relation:

$$H = F \times f/L$$

For the shoulder portions, suppose the breadth of shoulders be S, similarly, an image pattern having a breadth H is obtained on the sensor with the relation $H = S \times f/L$. This F can be obtained by triangulation as shown in FIG. 1A, or it may also be distinguished from the light amount of the reflected signal.

Figure 21B:
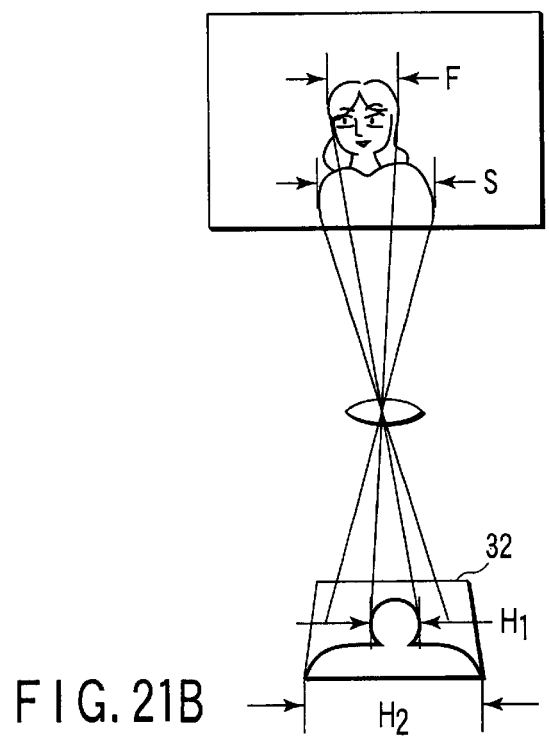
Figure 22:
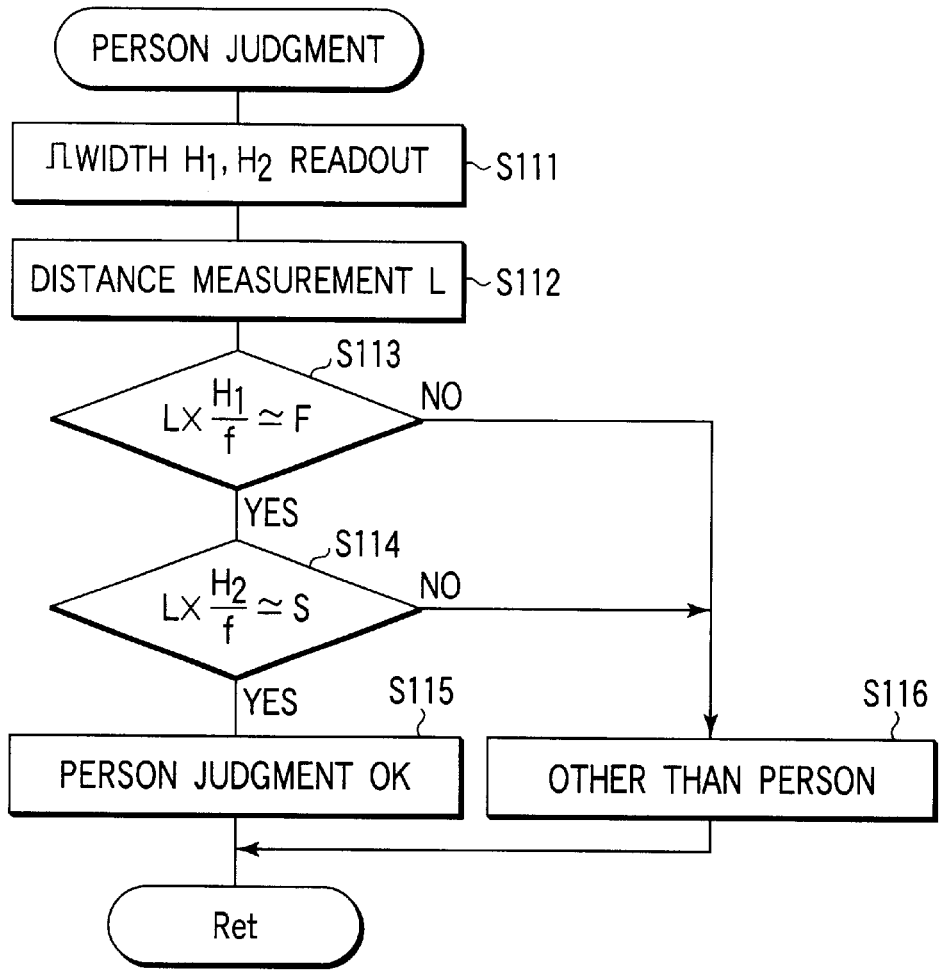
FIG. 22 is a flowchart illustrating the operation of human judgment.

As shown in FIG. 21B, when the breadth $H_1$, $H_2$ are detected on the area sensor, the CPU can judge a person using this L and $H_1$, $H_2$ and following a flowchart as shown in FIG. 22.

In other words, the breadth $H_1$, $H_2$ is read out in the step S111, and the distance is measured in the step S112. Then, the face breadth F and the breadth of shoulders S are compared with $H_1$, $H_2$ multiplied with L/f in the step S113 and 114. This allows to determined breadths on a field to shoot and a person can be distinguished by judging if they correspond approximately to the face breadth F (about 15 cm) and the breadth of shoulders S (about 40 cm).

As the results, if breadths on the field to shoot are values approximate to the face breadth and breadth of shoulders S, it passes to the step S115, to judge that it is a person. On the other hand, if breadths on the field to shoot are not values approximate to the face breadth and breadth of shoulders S, it passes to the step S116, to judge that it is not a person.

If it is displayed as shown in FIG. 10, FIG. 11 according to the judgment that the main object is really a person or not, a product on which the user can rely can be supplied.

Figure 18:
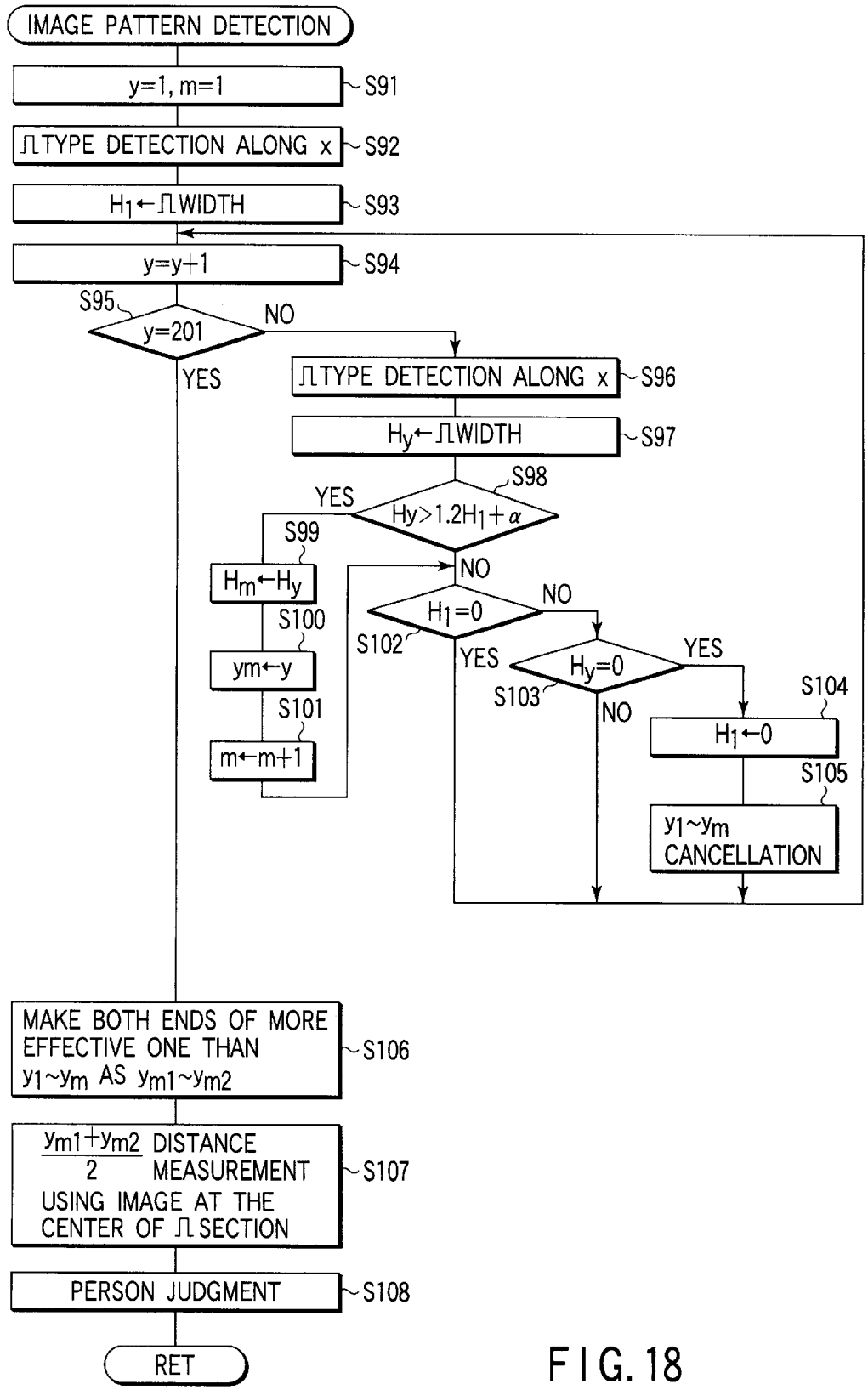
FIG. 18 is a flowchart illustrating an example of the other operation of image pattern detection.

For instance, in the step S108 of the flow shown in FIG. 18, this person recheck routine can be inserted using the obtained distance measurement results, to provide more reliable distance measurement apparatus.

As described above, the present invention can provide a distance measurement apparatus that can measure the distance instantaneously a large area in the picture, decide the distance measurement effectively and rapidly, and assure a accurate focusing.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A distance measurement apparatus for measuring a distance of a plurality of points in an area to be photographed, comprising:
   a flash circuit for projecting flashlight into said area to be photographed;
   an area sensor for receiving light of said flashlight reflected from an object, provided with a plurality of pixels arranged two-dimensionally;
   an A/D converter for converting respective pixel outputs of said area sensor into digital values, and outputting digital picture data; and
   a calculation control circuit for detecting a main object position in said area to be photographed based on said digital picture data and, at the same time, setting a distance measurement point on said main object position,
   wherein said calculation control circuit includes:
      an extraction section to extract a plurality of line data based on components of said flashlight from said digital picture data when said flashlight is projected;
      a judgment section for judging a part where a signal level varies by at least a predetermined value between adjacent pixels, for each of line data extracted by said extraction section, and specifying convex portions of said plurality of line data;
      a detection section for detecting said main object position, by comparing widths of the convex portions judged by said judgment section, for said plurality of line data; and
      a setting section for setting the distance measurement point at said main object position detected by said detection section.

2. A distance measurement apparatus measuring the distance of a plurality of points in an area to be photographed, comprising:
   light projection means for projecting light into said area to be photographed;
   an area sensor provided with a plurality of pixels arranged two dimensionally;
   extraction means to extract output from a plurality of pixel rows arranged on a straight line of said area sensor when said light is projected;
   detection means for judging the presence or absence of a particular pattern part which is convex for the output of respective pixel rows extracted by said extraction means, and detecting an object image pattern by comparing widths of particular pattern parts in the respective pixel rows; and
   setting means for identifying a main object based on the object image pattern detected by said detection means, and setting the distance measurement point at a position of the main object.

3. The distance measurement apparatus according to claim 2, wherein the object image pattern detected by said detection means is a pattern showing a human shape.

4. The distance measurement apparatus according to claim 2, wherein said setting means sets the distance measurement point at a control portion of the area to be photographed, when said object image pattern has not been detected by said detection means.

5. The distance measurement apparatus according to claim 2, further comprising:
   notification means for notifying a user that said detection means could not detect said object image pattern.

6. The distance measurement apparatus according to claim 5, wherein said notification means notifies the user by sound.

7. A distance measurement apparatus for measuring the distance of a plurality of points in an area to be photographed, comprising:
   photographing means, including an area sensor, for detecting images in said area to be photographed;
   extraction means for extracting output from a plurality of pixel rows arranged in a straight line of said area sensor;
   judgment means for judging a part where a signal level varies by at least a predetermined value between adjacent pixels, for each of line data extracted by said extraction means, and specifying convex portions of the output from respective pixel rows; and
   setting means for identifying a main object position based on the information concerning said convex portions in the respective pixel rows judged by said judgment means, and setting a distance measurement point at the main object position.

8. The distance measurement apparatus according to claim 7, further comprising:
   light projection means to project light into said area to be photographed, and
   wherein said extraction means operates when said light is projected by said light projection means.

9. The distance measurement apparatus according to claim 8, wherein said photographing means includes a stationary light elimination circuit for eliminating a stationary light component in said area to be photographed from an output signal from said area sensor.

* * * * *